(No Model.) 5 Sheets—Sheet 1.

J. H. EICKERSHOFF.
STEAM ENGINE.

No. 501,223. Patented July 11, 1893.

Witnesses
James H. Ramsey
Benjamin Bloch

Inventor
John H. Eickershoff.
By Geo. B. Parkinson,
His Attorney.

(No Model.)

5 Sheets—Sheet 2.

J. H. EICKERSHOFF.
STEAM ENGINE.

No. 501,223.   Patented July 11, 1893.

Witnesses
James N. Ramsey
Benjamin Bloch

Inventor
John H. Eickershoff
By Geo. B. Parkinson,
His attorney.

(No Model.)　　　　　　　J. H. EICKERSHOFF.　　　5 Sheets—Sheet 3.
STEAM ENGINE.
No. 501,223.　　　　　　　　　　　　Patented July 11, 1893.
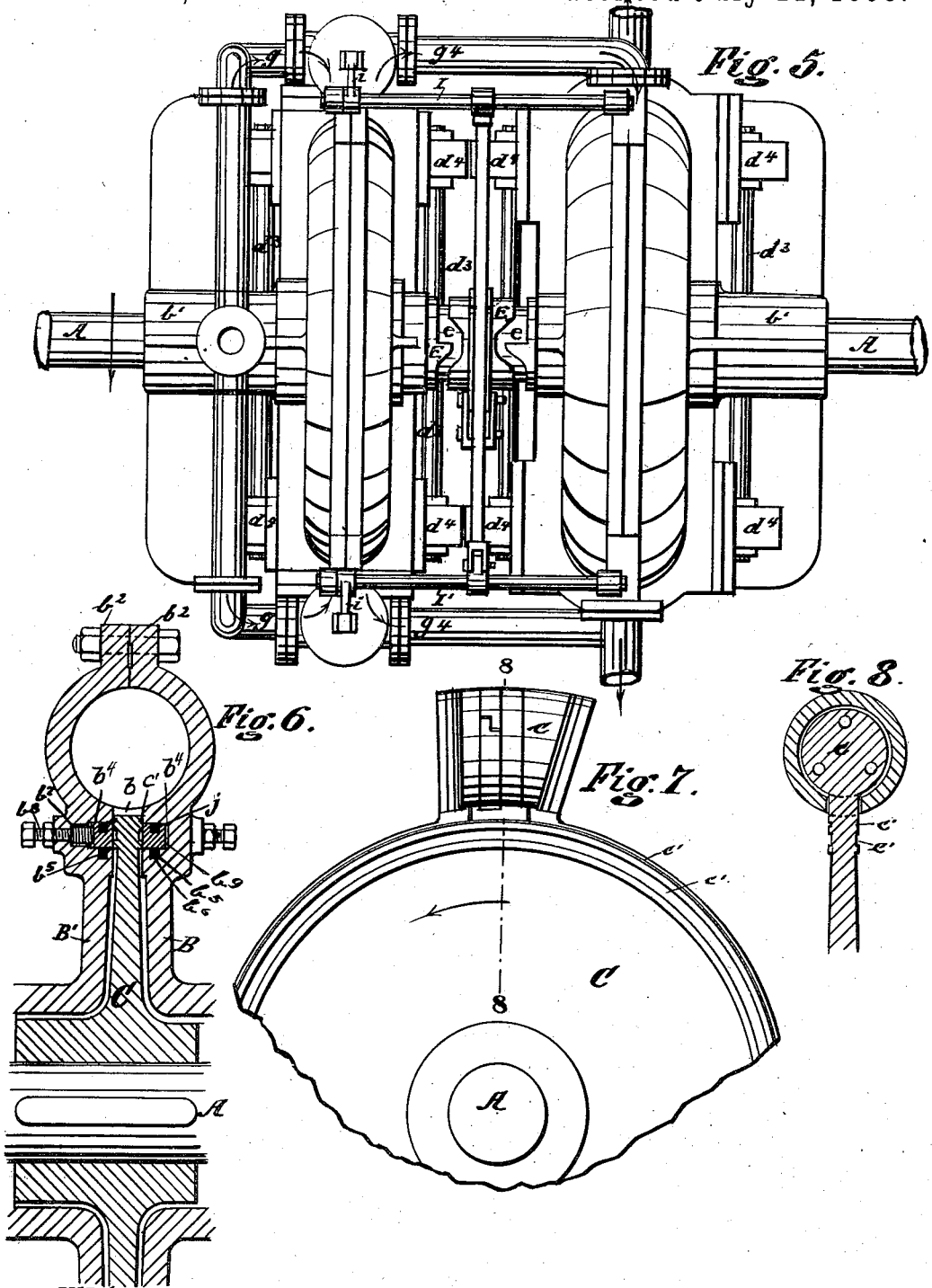
Witnesses
James N. Ramsey
Benjamin Bloch
Inventor
John H. Eickershoff
By Geo. J. Parkinson,
His Attorney.

(No Model.) J. H. EICKERSHOFF. 5 Sheets—Sheet 4.
STEAM ENGINE.

No. 501,223. Patented July 11, 1893.

Witnesses
James N. Rauey
Benjamin Bloch

Inventor
John H. Eickershoff.
By Geo. B. Parkinson,
His Attorney (No Model.)　　　　　　J. H. EICKERSHOFF.　　　5 Sheets—Sheet 5.
STEAM ENGINE.
No. 501,223.　　　　　　　　Patented July 11, 1893.
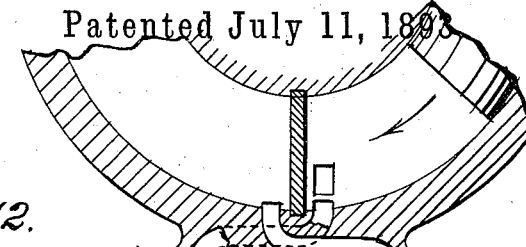
*Fig. 12.*
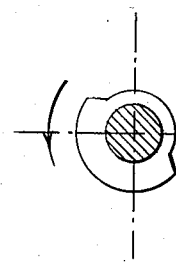
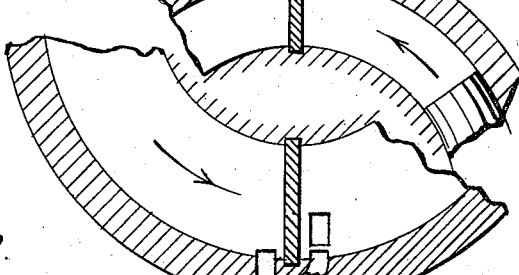
*Fig. 13.*
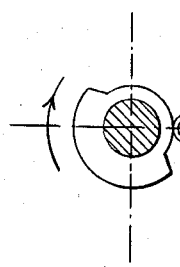
*Fig. 14.*
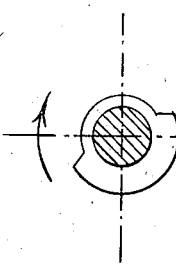
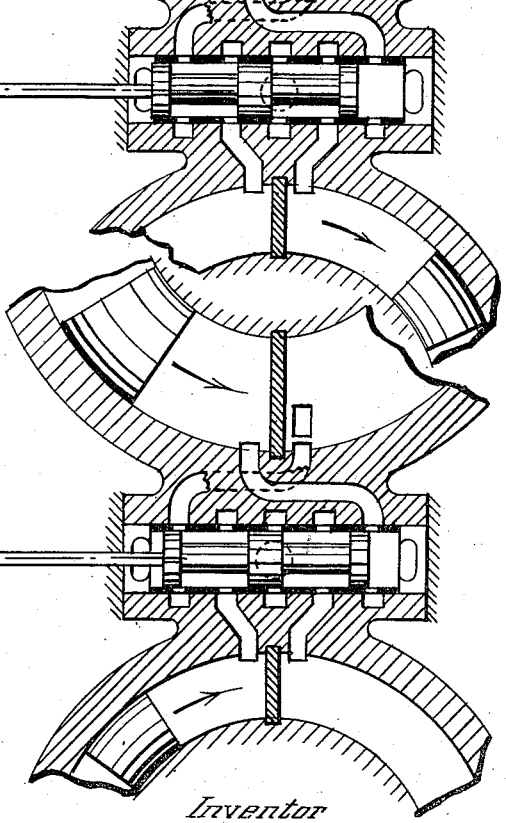
Witnesses
James N. Ramsey
Benjamin Bloch
Inventor
John H. Eickershoff,
By Geo. B. Parkinson,
His attorney.

UNITED STATES PATENT OFFICE.

JOHN H. EICKERSHOFF, OF CINCINNATI, OHIO, ASSIGNOR TO THE UNITED STATES ENGINE COMPANY, OF SAME PLACE.

STEAM-ENGINE.

SPECIFICATION forming part of Letters Patent No. 501,223, dated July 11, 1893.

Application filed October 8, 1892. Serial No. 448,272. (No model.)

*To all whom it may concern:*

Be it known that I, JOHN H. EICKERSHOFF, a citizen of the United States, residing at Cincinnati, in the county of Hamilton and State of Ohio, have invented certain new and useful Improvements in Steam-Engines, of which the following is a specification.

The object of my invention is to provide an engine by which a larger proportion of the steam pressure may be rendered effective; which is always balanced whatever the load may be; and in which a high rate of piston speed relatively to the speed of the shaft may be obtained.

My invention relates to that class of engines which has a continuous piston chamber provided with an opening in its periphery through which the pistons are connected with the shaft, and the invention consists in an arrangement of the pistons, the resistance slides and the ports whereby the engine is always balanced and in the parts and construction and arrangement of parts hereinafter described and claimed.

My invention may be embodied in simple or compound, expansion or non expansion reversible or non reversible engines.

Figure 1:
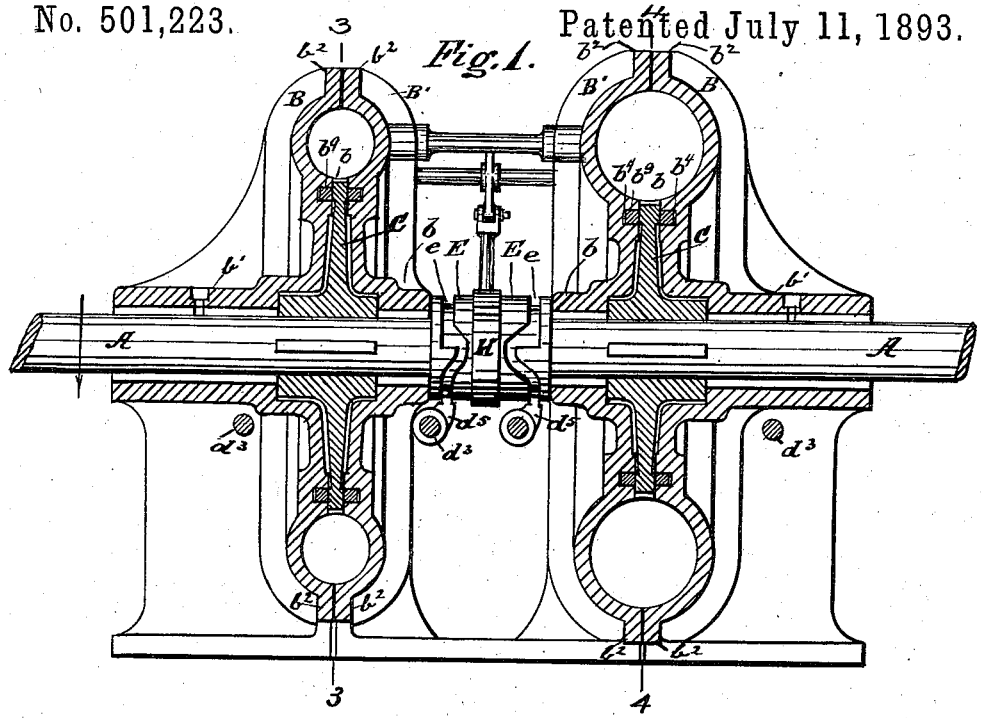
Figure 2:
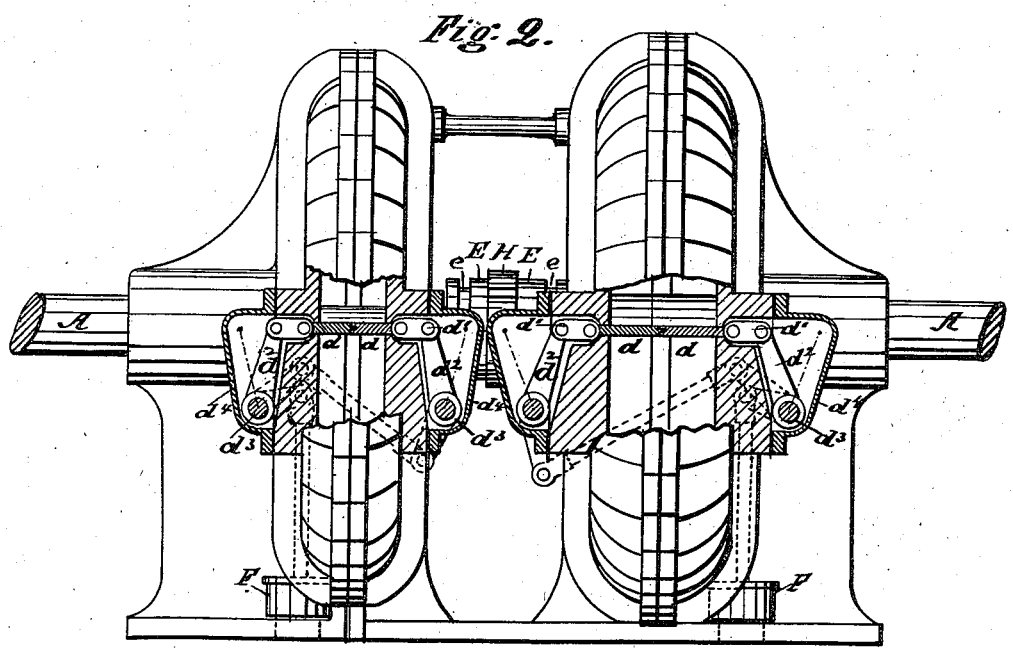
Figure 3:
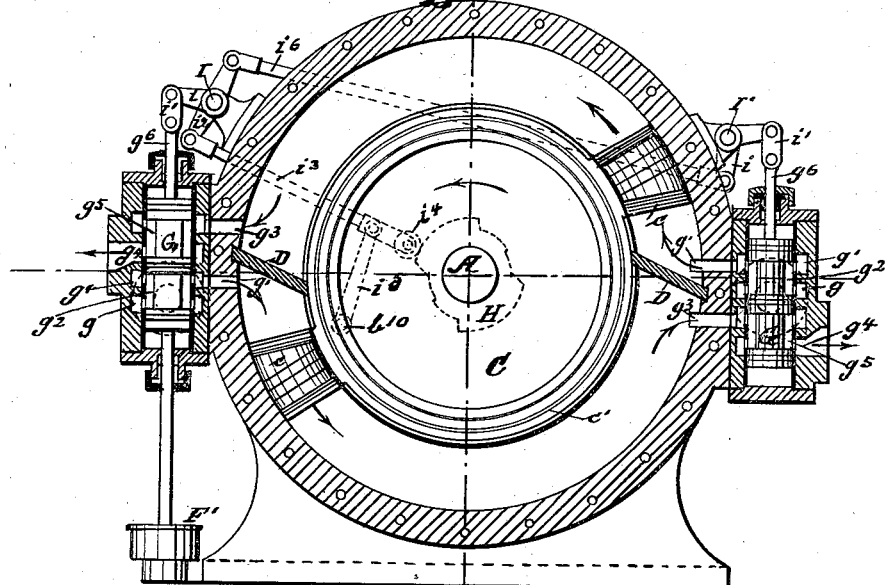
Figure 4:
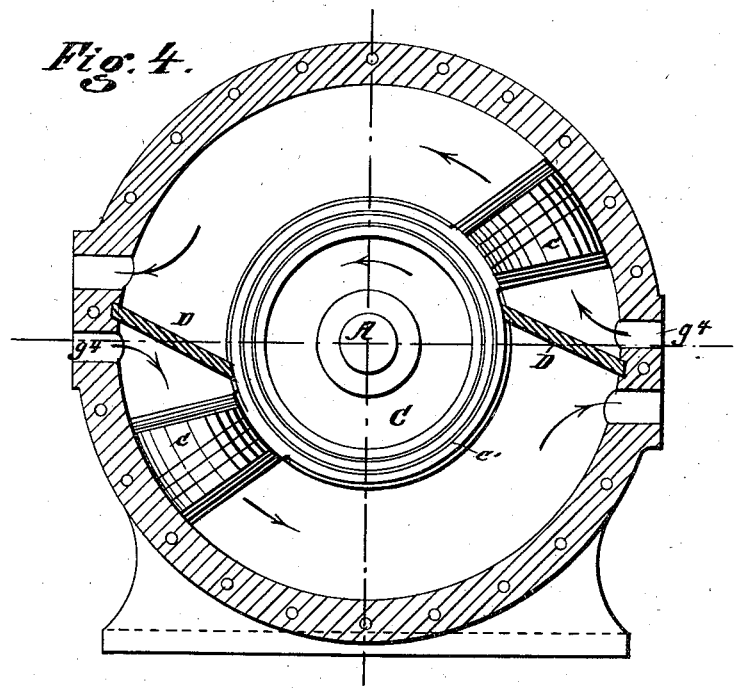
Figure 9:
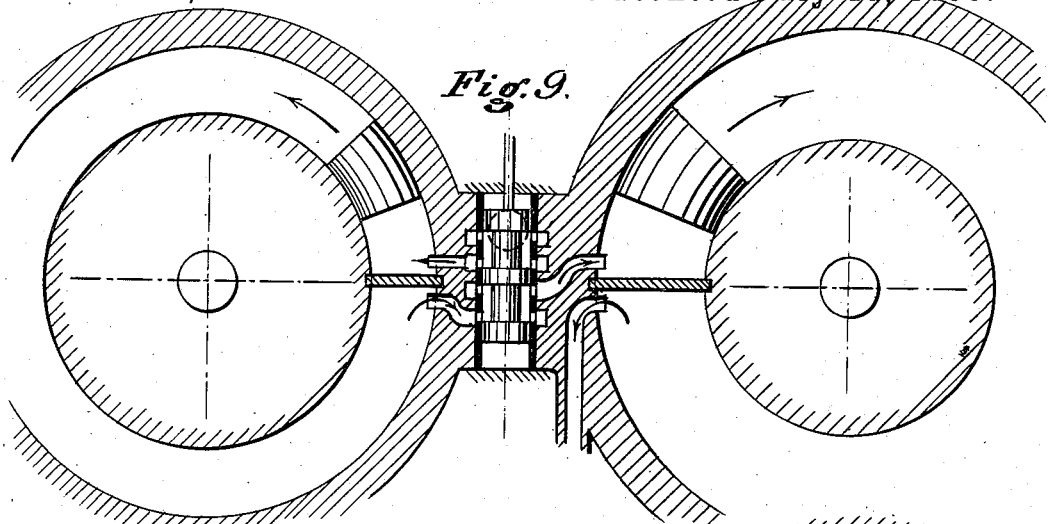
Figure 10:
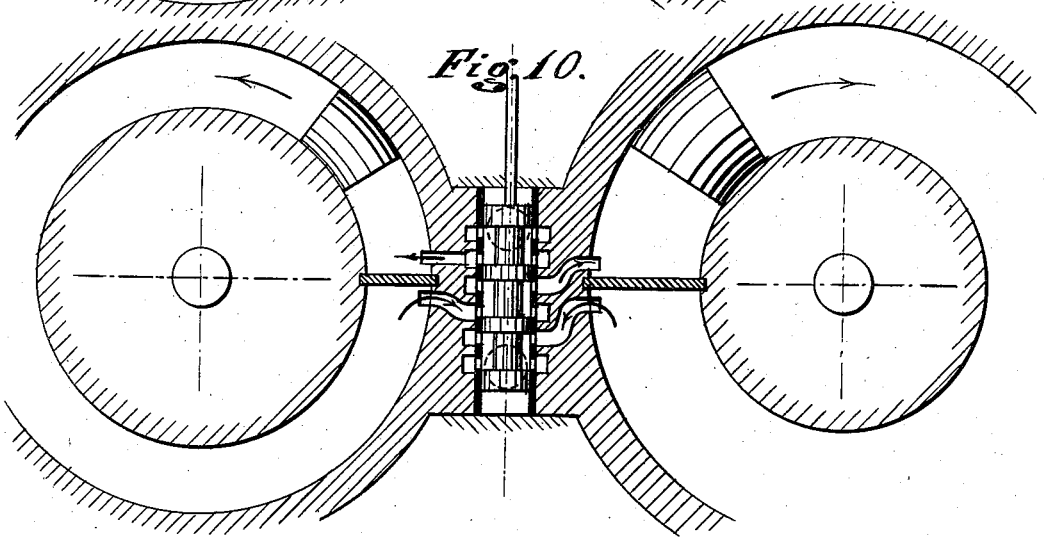
Figure 11:
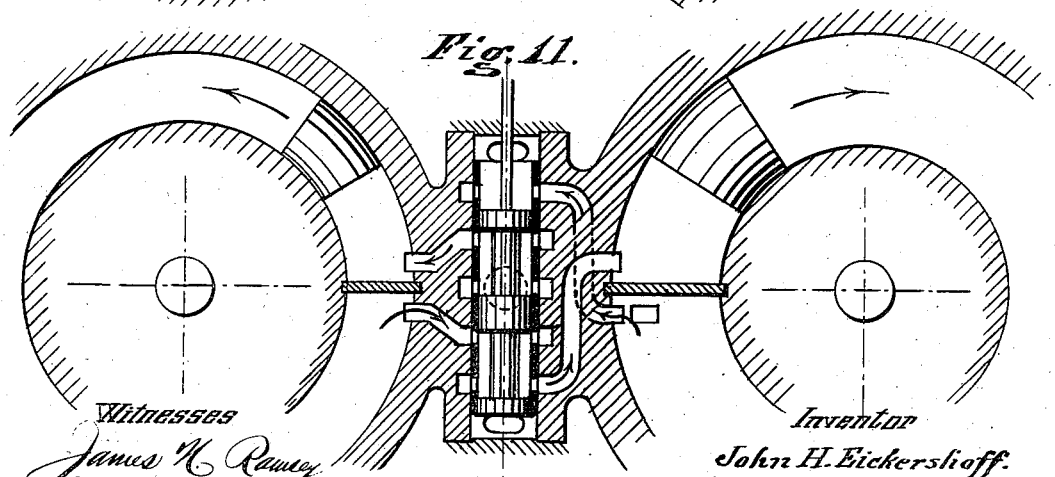

In the drawings: Figure 1 is a vertical cross section through the high and low pressure cylinder and the piston carrying plates of a compound engine embodying my invention. Fig. 2 is an end view of the same, partly in section; Fig. 3 a vertical section through the high pressure cylinder and distribution valves on line 3—3 of Fig. 1. Fig. 4 is a vertical section through the low pressure cylinder on line 4—4 of Fig. 1. Fig. 5 is a top view of the engine shown in the preceding figures. Fig. 6 is an enlarged sectional view through one of the cylinders and piston plates showing the packing rings for the piston plate. Fig. 7 is a side view of a piston plate and piston. Fig. 8 is a cross section of a piston plate, piston and packing on line 8—8 of Fig. 7. Fig. 9 is a diagrammatic view showing the distribution valve and corresponding steam ports so constructed and arranged that the exhaust is free. Fig. 10 is a like view showing a construction and arrangement in which the exhaust is controlled by the distribution valve. Figs. 11, 12, 13 and 14 are diagrammatic views illustrating the distribution valves and corresponding parts and showing how an engine of this type may be reversed by simply changing the length of the valve rod.

A is the main shaft. B and B' represent sections which when united form an annular piston chamber which may be of any desired cylinder form in cross section, but hereinafter called a cylinder, having in its periphery a longitudinal slot $b$. These sections are provided with hubs $b'$ which take over the shaft but leave the latter free to revolve therein. The sections are also provided at their points of contact with flanges $b^2$ by means of which they may be firmly bolted together. The joint surfaces may be well ground and will then require no packing.

C is a piston plate, keyed to the shaft, preferably in the form of a disk, adapted to revolve within the space between the cylinder sections and carrying a pair of pistons $c$ corresponding in cross section to the interior of the piston chamber. The periphery of the plate is suitably packed preferably in a manner to be more fully described hereinafter. The piston plates C are provided upon each face, near their peripheries, with annular steam grooves $c'$ (shown most clearly in Figs. 6, 7 and 8). In the shank portion of each of the cylinder sections, near the piston chamber, is an annular groove $b^4$ adapted to receive a ring $b^9$ of bronze or other suitable material. Each of the grooves $b^4$ has in one of its side walls a groove $b^5$ adapted to receive an expansible packing ring $b^6$, and each of the rings $b^9$ has an annular groove $j$ also adapted to receive an expansible packing ring $j$. Back of the groove $b^4$ are socket holes arranged at suitable intervals and adapted to receive spiral springs $b^7$ the tension of which may be regulated by set screws $b^8$. By this means the pressure of rings $b^9$ against the piston plates may be regulated at will. It will be seen that any steam which may get from the piston cylinder into the joint between the rings $b^9$ and the side walls of grooves $b^5$ will force the expansible rings against the opposing bearings and render the joints steam tight.

D D are resistance slides or plates adapted to divide the annular piston chamber into compartments and to be withdrawn or retracted as the pistons approach them. In the form shown in Figs. 1 and 2 these slides are composed of two parts $d$ $d$ adapted to overlap or interlock, each part being connected by links $d'$ to crank arms $d^2$ mounted upon suitable rock shafts $d^3$. I prefer to inclose the links and crank arms in suitable housings $d^4$. This arrangement permits the steam pressure to force the slides against their seats when in position thereby insuring a practically steam tight joint without regard to wear and avoiding all danger of binding and twisting which might result if the slides were rigidly connected with the operating mechanism. The grooves in the cylinder walls in which the resistance plates are seated extend diagonally across the piston chamber so that the packing rings of the piston shall not be opposite the entire groove at the same time which would permit the packing of the pistons to slip into the grooves. When the grooves are placed diagonally the packing rings pass a section at a time and it is impossible for the rings to slip into the grooves.

Upon the shaft A, I mount two collars E, E provided with cam grooves $e$ $e$. The rock shafts $d^3$ are provided with arms $d^5$ taking into the grooves. The latter are so arranged as to actuate gradually the rock shafts for the outward movement of the slides as the pistons approach the latter, and to allow the slides to close instantaneously, when the piston has passed. For the quick return of the slides I have made a right angled offset in the grooves $e$ $e$, and for the positive action I provide dash pots F connected to the rock shafts $d^3$.

G G are the distribution valves which are represented as piston valves, those shown in Fig. 3 being two-chamber piston valves adapted to control the admission, expansion and exhaust of steam.

The connections are as follows: $g$ is the steam inlet, $g'$ a port to the high pressure cylinder which, when connected with the steam inlet by the valve chamber $g^2$, makes a passage for the live steam to the cylinder, $g^3$ a port for the exhaust from the high pressure cylinder, and $g^4$ a port which, when connected with the high pressure exhaust $g^3$ by valve chamber $g^5$, makes a passage to the low pressure cylinder.

Upon shaft A is mounted a cam wheel H. I and I' are rock shafts each provided with crank arms $i$ connected by links $i'$ to the respective valve rods $g^6$. A lever arm $i^2$ is fixed to the rock shaft I and connected with one end of this arm is a rod $i^3$, carrying at its free end a roller $i^4$ adapted to engage with the cam surface of wheel H, and supported by an arm $i^5$ pivoted at a suitable point $b^{10}$. To the other end of lever arm $i^2$ is pivoted one end of a connecting rod $i^6$ the other end of which is pivoted to the crank arm $i$ of rock-shaft I'. The valve-rod $g^6$ is extended below the valve and carries a dash pot F' which holds roller $i^4$ against cam H, so that the piston valves G, G, are positively operated by the cam, a quick action of the distribution valves being necessary for the high piston speed.

In Fig. 10 the valve is three chambered and arranged to control the exhaust port $g^4$.

In Figs. 11 to 14 I have shown an arrangement by which a compound engine of this type can be reversed by having an extensible valve rod the ports to and from the low pressure cylinder being crossed. In the form shown the two parts of the valve rod are provided respectively with right and left screws taking into a threaded sleeve $g^7$. By lengthening the rod as shown by the arrows in Figs. 11 and 12 the engine acts in one direction; by shortening the rod it acts in the other direction as shown by the arrows in Figs. 13 and 14.

The operation is as follows: The resistance plates being in their operative position, steam, being admitted through the steam inlets $g$, distribution valves G and ports $g'$, to the high pressure cylinder, forces the pistons along the cylinder in the direction indicated by the arrows, the power being transmitted to the shaft by the piston plate C and the air or steam in advance of the pistons, escaping through the exhaust ports. As the pistons approach the resistance plates the latter are withdrawn and, when the pistons have passed their seats, quickly returned. The exhaust from the high pressure cylinder goes to the low pressure cylinder and the operation in the latter is identical with that in the high pressure cylinder.

I have shown the piston cylinders divided into one pair of compartments by one pair of resistance slides and containing but one pair of pistons but it is obvious that two or more pairs of pistons may be used, the number of resistance slides being correspondingly increased.

I claim as my invention—

1. In a steam engine a continuous cylinder having a slot in its periphery; a plate mounted upon the shaft taking into the slot and carrying a pair of pistons; a pair of resistance slides taking diagonally across the section of the cylinder, and balanced piston valves controlling the distribution of steam substantially as set forth.

2. In a steam engine a continuous cylinder having a slot in its periphery; a plate mounted upon the shaft, taking into the slot and carrying a pair of pistons, a pair of self-seating resistance slides and link connection between the parts of the slides and the operating mechanism, and balanced piston valves controlling the admission and exhaust of steam, substantially as set forth.

3. In a steam engine a continuous cylinder having a slot in its periphery; a plate mounted upon the shaft, taking into the slot and carrying a pair of pistons; a pair of self-seating resistance slides composed of parts adapted to overlap or interlock with each other and a link connection between the parts of the slides and the operating mechanism, and balanced piston valves controlling the distribution of steam, substantially as set forth.

4. In a steam engine a continuous cylinder having a slot in its periphery; a plate mounted upon the shaft taking into the slot and carrying a pair of pistons; a pair of self seating resist-slides operated from the main shaft by a collar with cam grooves, a rock shaft and a set of levers, and a dash pot for the quick closing of the slides, substantially as set forth.

5. In a steam engine a continuous cylinder having a slot in its periphery; a plate mounted upon the shaft taking into the slot and carrying a pair of pistons; a pair of resistance slides taking diagonally across the cylinder; a rock shaft operated from the main shaft, levers and links connecting the rock shaft and the resistance slides and steam tight housings inclosing the bearings for the rock shaft, the resistance slides, the links and the levers, substantially as set forth.

6. In a compound engine two continuous cylinders having slots in their peripheries; plates mounted upon the shafts taking into the slots, and each carrying a pair of pistons; a pair of resistance slides taking diagonally across the cylinders and balanced piston valves each controlling the admission of steam to the two cylinders and the exhaust therefrom, substantially as set forth.

7. In a compound engine two continuous cylinders having slots in their peripheries, plates mounted upon the shafts taking into the slots and each carrying a pair of pistons; a pair of resistance slides in each of the cylinders taking diagonally across the cylinder, and balanced piston valves each controlling the admission, expansion and exhaust of steam, substantially as set forth.

8. In a compound engine two continuous cylinders having slots in their peripheries, plates mounted upon the shafts, taking into the slots, and each carrying a pair of pistons; a pair of self-seating resistance slides taking diagonally across the cylinder; balanced piston valves, moving in opposite directions and operated by a cam wheel; a set of levers, and a dash pot, connected to one of the piston valves, for the quick return of the same, substantially as set forth.

9. In a steam engine a continuous cylinder having a slot in its periphery, a plate mounted upon the shaft, taking into the slot and carrying a pair of pistons mounted opposite each other; a pair of resistance slides taking diagonally across the cylinder and mounted opposite each other, and a pair of balanced piston valves mounted opposite each other, substantially as set forth.

10. In a compound engine, two continuous cylinders having slots in their peripheries, plates mounted upon the shafts, taking into the slots and each carrying a pair of pistons, a pair of resistance slides in each cylinder, distribution valves having the ports to the low pressure cylinder crossing each other and an extensible valve rod whereby the distribution valve may be actuated, and the engine reversed, substantially as set forth.

JOHN H. EICKERSHOFF.

Witnesses:
JAMES H. RAMSEY,
BENJAMIN BLOCH.